United States Patent [19]

Le Boudec et al.

[11] Patent Number: 5,432,777
[45] Date of Patent: Jul. 11, 1995

[54] CONNECTIONLESS ATM DATA SERVICES

[75] Inventors: Jean-Yves Le Boudec, Adliswil; Linh Truong, Gattikon, both of Switzerland

[73] Assignee: International Business Machines Corp., Armonk, N.Y.

[21] Appl. No.: 807,359

[22] Filed: Dec. 16, 1991

[30] Foreign Application Priority Data

Aug. 21, 1991 [EP] European Pat. Off. ............ 91810699

[51] Int. Cl.⁶ .......................... H04J 3/24; H04L 12/56
[52] U.S. Cl. ..................................... 370/60; 370/94.1
[58] Field of Search ......................... 370/54, 58.1, 58.2, 370/58.3, 60, 60.1, 85.13, 85.14, 94.1, 94.2, 94.3

[56] References Cited

U.S. PATENT DOCUMENTS

| | | | |
|---|---|---|---|
| 4,975,906 | 12/1990 | Takiyasu et al. | 370/94.1 |
| 5,067,123 | 11/1991 | Hyodo et al. | 370/94.1 |
| 5,084,867 | 1/1992 | Tachibana et al. | 370/60 |
| 5,119,369 | 6/1992 | Tanabe et al. | 370/60 |
| 5,202,885 | 4/1993 | Schrodi et al. | 370/94.1 |

FOREIGN PATENT DOCUMENTS 0253940 1/1988 European Pat. Off. .

OTHER PUBLICATIONS

Elektrisches Nachrichtenwesen, Band 64, Nummer 2/3, 1990, "Grundlagen und Vorteile des ATM-Verfahrens" by J. Dupraz and M. De Prycker.
International Journal of Digital and Analog Cabled Systems, vol. 1, 257–262, 1988, "The Virtual Path Identifier and Its Applications for Routeing and Priority of Connectionless and Connection-Orientated Services" by J. L. Adams.
CCITT, Study Group XVIII, Question: 2,13/XVIII, Jun. 1991, Geneva Recommendation I. 150, "B-ISDN Asynchronous Transfer Mode Functional Characteristics", TD 65.
CCITT, Study Group XVIII, Jun. 1991, Geneva, Recommendation I.121, "Broadband Aspects of ISDN", Draft Revision.
CCITT, Study Group XVIII, Jun. 1991, Geneva, Recommendation I.311, "B-ISDN General Network Aspects", TD 56.
J. Dupraz et al: "Principles and Benefits of the Asynchronous Transfer Mode" Electrocal Communication, vol. 64, No. 2/3, 1990, pp. 116–123.
Proc. of the Int. Switching Symposium Stockholm, vol. 6, pp. 5–10.
Pro. of the Int. Switching Symposium, May, '90 vol. 2, pp. 133–137.
Ohta et al., "A Dynamically Controllable ATM Transport Network Based on the Virtual Path Concept", IEEE CH2535-3/88/000-1272, pp. 39.2.1–39.2.5.

*Primary Examiner*—Alpus Hsu
*Attorney, Agent, or Firm*—Joscelyn G. Cockburn

[57] ABSTRACT

In a system using the Asynchronous Transfer Mode (ATM) for data transfers, each cell is usually routed in response to VPI/VCI values identifying a previously established connection. A connectionless transfer mode is disclosed by which to each requesting user, a unique routing identifier (RI) is allocated. All RIs allocated in the whole network are kept in a table of a routing identifier management function (RIMF). When a source user wants to send a message to a destination user, it requests the destination RI from the RIMF and inserts the received RI into each transmitted cell in the VCI field. The RI may, include a switching node identifier (SI) and a port identifier (PI). In that case, each switching node has a permanent table of all SIs plus respective routing information, and a changing table of all currently allocated PIs of locally connected users plus the respective user port names.

12 Claims, 5 Drawing Sheets

| UT ADDRESS | RI | | ACT. |
|---|---|---|---|
| | SI | PI | |
| | | | |
| | | | |
| | | | |
| ≈ | ≈ | ≈ | ≈ |
| | | | |
| n | 6 | 10 | 1 |

FIG. 8

| 6 | k | 1 |
|---|---|---|
| SWITCH ID | ROUTE (LINK OUT) | |
| | | |
| | | |
| | | |
| ≈ | ≈ | ≈ |
| | | |

FIG. 9

| 10 | m | 1 |
|---|---|---|
| PORT ID | PHYS. PORT NAME | ACT. |
| | | |
| | | |
| | | |
| ≈ | ≈ | ≈ |
| | | |

CONNECTIONLESS ATM DATA SERVICES

FIELD OF INVENTION

Present invention is concerned with data transfer services in communication systems using the Asynchronous Transfer Mode (ATM), and in particular with connectionless data transfer services in ATM systems.

BACKGROUND

The CCITT has defined the Asynchronous Transfer Mode (ATM) as the transfer mode for implementing Broadband ISDN (B-ISDN). ATM is based on the use of shod, fixed-length packets called "cells". A cell consists of an information field prefixed with a header for routing and control information.

ATM cells are routed based on the contents of the VPI/VCI fields in the header. The VPI/VCI values are used in intermediate switching nodes in conjunction with routing tables to determine the outgoing link on which the cell should be forwarded. They are only valid for the current link and are in general replaced by a new value at the next section. The routing table in any switching node contains an entry for each VPI/VCI value assigned on each incoming link, with the entry providing a mapping to the appropriate outgoing link and the new VPI/VCI value to be used on that link. The assignment of the VPI/VCI values and construction of the routing table entries are carried out as part of a connection setup procedure. Hence. ATM networks provide basically a connection-oriented virtual circuit service.

Different aspects of ATM and its application are described in the following publications:
a) CCITT Study Group XVIII, Report R34, June 1990. This includes:
  Draft Recommendation 1.121: Broadband aspects of ISDN.
  Draft Recommendation 1.150: B-ISDN ATM functional characteristics.
  Draft Recommendation 1.311: B-ISDN general network aspects.
b) J. Dupraz et al.: "Principles and Benefits of the Asynchronous Transfer Mode". Electrical Communication, Vol. 64, No. 2/3, 1990, pp. 116–123.
c) J. L. Adams: "The Virtual Path Identifier and Its Application for Routeing and Priority of Connectionless and Connection-Oriented Services". Int. J. of Digital and Analog Cabled Systems, Vol. 1, No. 4 (1988). pp. 257–262.

To provide connectionless data services, CCITT defined a Connectionless Service Function (CLSF) grouping which terminates the connectionless protocol and routes cells to a destination user according to routing information included in user cells. However, using this procedure the ATM network merely provides access to the CLSF rather than providing a real connectionless service.

The respective proposal was published also in the above mentioned CCITT report R34, as Draft Recommendation 1.327: B-ISDN Functional Architecture (in particular Annex A "Support of connectionless data services in a B-ISDN").

The routing and switching functions which are performed by the connectionless data services proposed by CCITT only exploit the VPI/VCI switching principles of the ATM to transfer the cells carrying connectionless messages between the users and the CLSF. Within the CLSFs a second layer of switching, called "overlay" switching, is performed based on ST and MID fields in the cell headers.

The disadvantages of this two-level switching concept lay mainly in the use of the CLSF, especially in the case where the two communicating users are attached to the same ATM switch. In this case the cells exchanged between the two users are transmitted twice through the ATM switch. Furthermore, the CLSF has to maintain transient data structures for every message, in order to handle routing and MID fields. Besides, in case of heavy local traffic the CLSF may represent the bottleneck of the network, since all connectionless cells are first directed there before they are distributed.

OBJECTS OF THE INVENTION

It is therefore an object of present invention to provide a true connectionless transfer service for data messages in an ATM based system which avoids the disadvantages of the connectionless service using CLSF.

It is a further object of the invention to provide a connnectionless data transfer service which can be implemented by the addition of a few functions and tables in the user terminals, switching nodes and central management functions of the system.

A further object is the provision of a connectionless data transfer service in ATM based systems which requires for the routing of each cell only a table look-up and hardware supported operations in each switching node.

SUMMARY OF THE INVENTION

The above objects are achieved by a method and by apparatus for transferring data messages without establishing a connection between users, in an ATM system otherwise using established virtual connections for data message transfers through a network. Particular advantages of the invention are its simple implementation and the fact that each ATM cell transferred between two users has to be transmitted only once through any ATM switching node. A further advantage is that the RI value used for connectionless routing remains the same throughout the network and need not to be changed in every node.

These and other advantages will become apparent from a preferred embodiment of the invention which is described in the following with reference to drawings.

DETAILED DESCRIPTION

1) Environment

Figure 1:
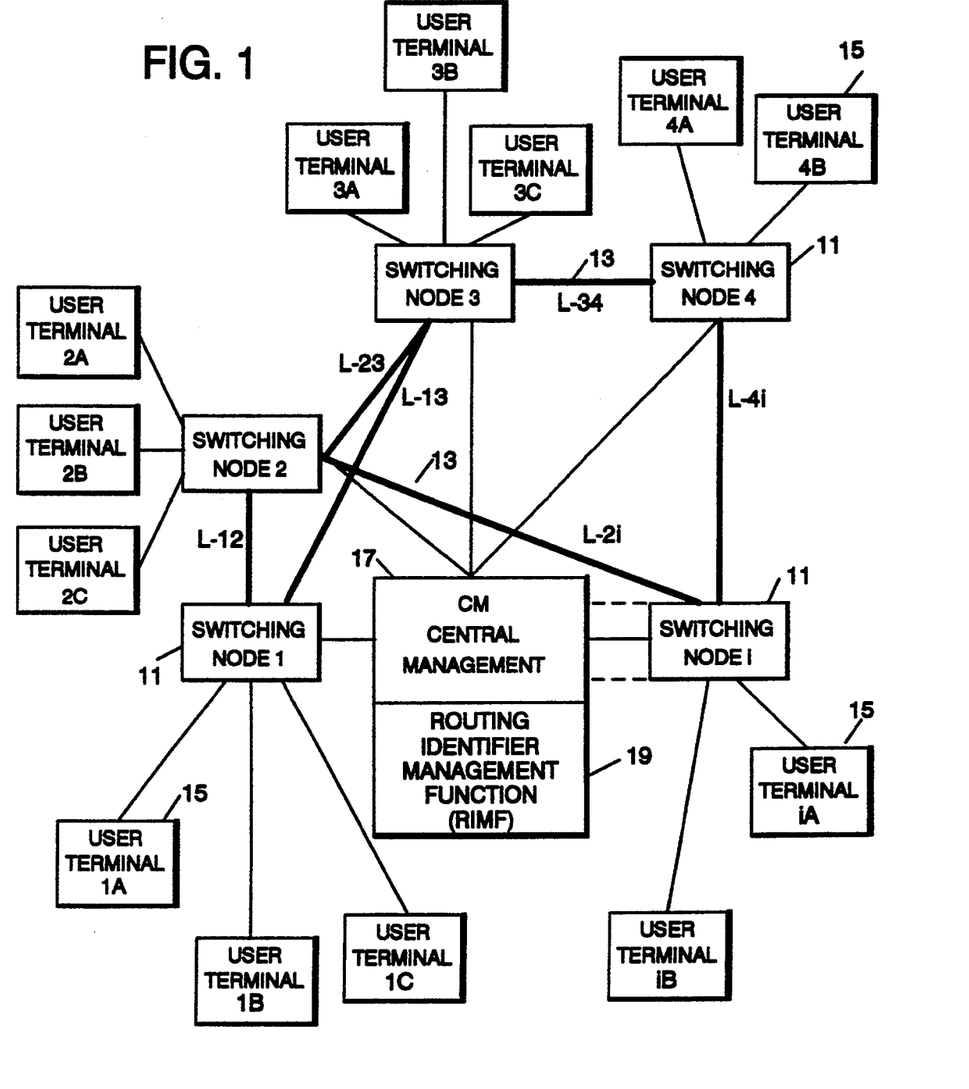
FIG. 1 shows the configuration of a communications network in which the invention can be used.

FIG. 1 shows the configuration of a communications network in which present invention may be used. The network includes several switching nodes 11 (SN-1 ... SN-i) which are interconnected by transmission links 13 (L-12 ... L-4i). A plurality of user terminals 15 (UT-1A ... UT-iB) are attached to each of the switching nodes. For general functions, a central management 17 (CM) is provided to which each of the switching nodes is connected directly (or indirectly via another node SN). The CM function could also be integrated into one of the switching nodes (as indicated by dotted lines for SN-i).

Other configurations are of course possible such as ring networks or star networks. But the invention will be explained for the most general case of the meshed network shown in FIG. 1.

2) ATM Principles

The invention of present patent application is intended for systems operating according to ATM principles (Asynchnronous Transfer Mode). Thus, basic features of such systems will be briefly reviewed here.

Figure 2A:
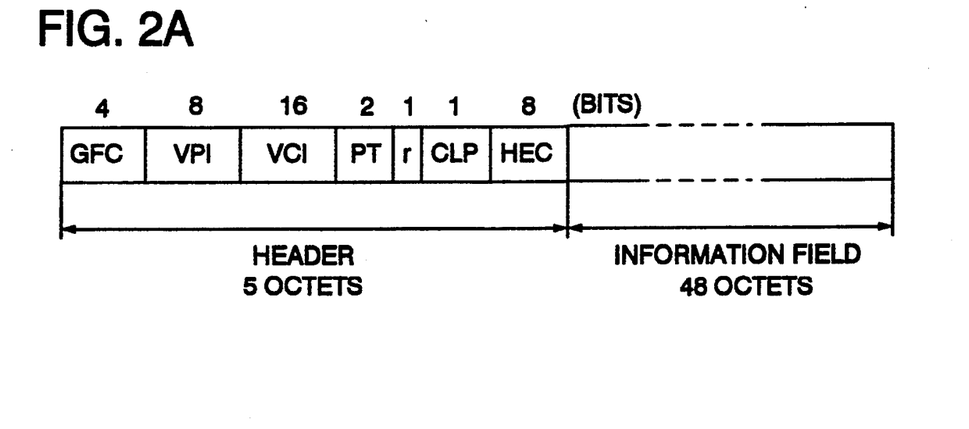
FIG. 2A shows the basic ATM cell format, giving details of the header.

Information is transferred in ATM systems in small fixed-size packets termed cells. The basic format of an ATM cell is shown in FIG. 2A. Each cell has a header containing control and routing information (as shown in FIG. 2A) and an information section carrying the payload of information. Messages to be transferred through the system have to be segmented into portions which can be carried by a cell and must later be reassembled at the destination location. The cell header comprises following fields:

| | | |
|---|---|---|
| GFC: | Generic Flow Control | (4 bits) |
| VPI: | Virtual Path Identifier | (8 bits) |
| VCI: | Virtual Circuit Identifier | (16 bits) |
| PT: | Payload Type | (2 bits) |
| r: | reserved | (1 bit) |
| CLP: | Cell Loss Priority | (1 bit) |
| HEC: | Header Error Correction | (8 bits) | a) Connection-Oriented Transmission

Usually, data are transferred through the network in connection-oriented mode. For each message transfer a connection is set up in advance, and this established connection is identified by the quantities VPI (Virtual Path Identifier) and VCI (Virtual Circuit Identifier) which are carried in the header of each cell. The virtual path is a principal path defined between two switching nodes, and the virtual circuit is one specific connection on the respective path. Details of this are explained e.g. in the following publications: a) CCITT Draft Recommendation 1.150 "B-ISDN ATM Functional Characteristics"; b) CCITT Draft Recommendation 1.311 "B-ISDN General Network Aspects"; both contained in Report 34 of CCITT Study Group XVIII (June 1990).

The VPI/VCI information is used by the switching nodes for routing the respective cell correctly to its destination. The VCI is changed in each switching node according to local tables in the respective node.

Because of the necessity to establish a connection before data can be exchanged between two user terminals, it is desirable to have also a possibility to exchange information (data) without previous set-up of a connection, e.g. for short occasional messages.

b) Connectionless Transmission Using CLSF

The CCITT has suggested one procedure for connectionless data services. For this purpose, a CLSF function is defined. It can be implemented in the Central Management CM, in each switching node SN, or in a stand-alone server. One specific virtual connection is reserved for connectionless services and if a user terminal wants to send a message (i.e. the cells of this message) to another user in connectionless mode, it inserts into the headers of the cells to be transmitted the VPI/VCI reserved for connectionless services. Furthermore, in the first cell of a message's cell sequence, it inserts the destination address. The switching node to which the respective sending user is attached forwards this cell to the CLSF function which then extracts the destination address and executes all operations necessary for correctly routing this cell (and all following cells of the same message). The VPI/VCI values usually have to be changed in each node.

Figures 2B, 3:
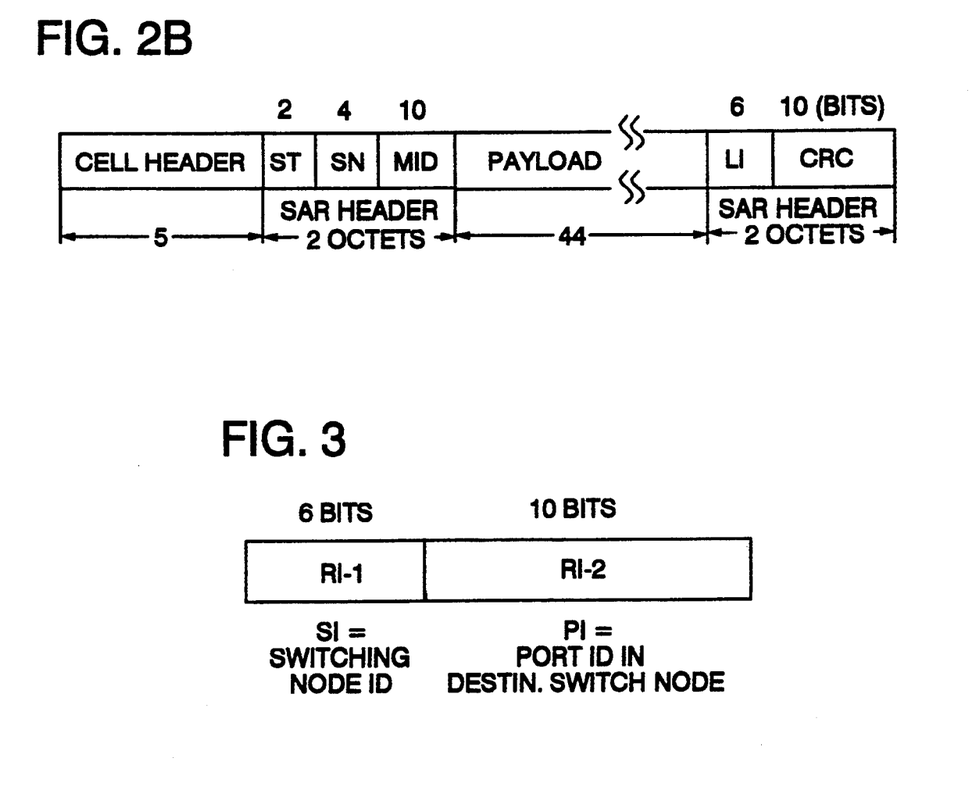
FIG. 2B shows the ATM cell format for connectionless data services, giving details of SAR header and SAR trailer to be used in the information section of each cell.
FIG. 3 is a schematic representation of the format of Routing Identifiers RI which are provided by the invention.

The cell format is modified for connectionless data services using CLSF, to allow correct segmenting and ressambly (SAR) of messages, and the respective format is shown in FIG. 2B. As can be seen, the payload in the information section of each cell has to be preceded by an SAR header, and an SAR trailer must be appended. The MID value (multiplexing identifier) is identical for all cells of the same message.

The SAR header and trailer comprise following fields (SAR=Segmenting and Reassembly):

| | | |
|---|---|---|
| ST: | Segment Type | (2 bits) |
| SN: | Sequence Number | (4 bits) |
| MID: | Multiplexing Identification | (10 bits) |
| LI: | Length Indicator | (6 bits) |
| CRC: | Cyclic Redundancy Check | (10 bitb) |

The CLSF function is a complex function which has to be invoked for routing each cell, and therefore this procedure is time-consuming. Its disadvantages were mentioned in the introduction already.

3) True Connectionless Data Transfer According to Invention

According to the present invention, a Routing Identifier RI is defined and a procedure is established which allows faster and more simple connectionless services than with the CCITT procedure using CLSFs.

The procedure is as follows:

a) Each user terminal attached to a switching node which wants to participate in connectionless services sends a respective request (notification) to its switching node; the switching node then allocates a unique Routing Identifier to this user terminal. This RI, when inserted into a cell destined for the respective user terminal, enables each switching node to correctly route the cell to its destination. The RI will not be changed in any of the switching nodes.

b) All switching nodes maintain tables (lists) which allow immediate routing of a connectionless cell in response to the Routing Identifier RI it contains. This may be implemented as follows (other implementations being possible of course):

b1) Each switching node keeps a table of all RIs allocated by it to locally attached user terminals, plus the respective physical port name to enable correct forwarding of cells from the destination switching node to the destination user.

b2) Each switching node has a routing table (set up at network configuration time) which contains information for connectionless routing of cells with known destination node. This requires that each RI used for connectionless services allows to identify (or directly identifies) the destination switching node.

c) A central Routing Identifier Management Function (RIMF) which can be provided as addition 19 to the Central Management CM of the network (as shown in FIG. 1) maintains a table of all RIs allocated in the whole network. It includes in each entry the address of a user terminal, and the respective allocated RI, plus an indication whether the entry is valid (the user terminal is activated) for connectionless services. Each time a switching node allocates a Routing Identifier it reports the user terminal's address and the RI to the RIMF for updating the central (global) RI table. User terminal addresses entered into this table may be e.g. CCITT E.164 addresses or OSI addresses.

d) When any user terminal wants to send a message to another user terminal in connectionless mode, it first sends an inquiry to the central RIMF, giving the address of the destination user terminal. The RIMF will then respond by sending the allocated RI to the requesting user terminal, or it will return an error message (if the destination terminal is presently not active, or no RI is known for it).

e) The sending terminal then sends each cell for the message, indicating connectionless service (e.g. by inserting a respective code in the VPI field), and with a VCI field carrying the RI of the destination terminal. By evaluating the VCI field, each switching node is able to correctly route the respective cell towards its destination. This requires, however, that intermediate switching nodes (i.e. those which are not directly connected with the destination terminal), can determine from the RI the destination node and thus the route to the next appropriate switching node.

A possible format for the Routing Identifier RI is shown in FIG. 3. As the RI is to be carried by the VCI field in each cell, it has a length of two octets (16 bits). It consists (preferably) of two portions:

RI-1: This portion includes 6 bits and identifies the switching node to which the user terminal allocated this RI is connected. Thus, 64 different switching nodes can be identified. From this first portion of the RI, each switching node can immediately determine where the cell has to be routed, or whether the cell has already reached its destination node (if RI-1 designates the switch where the cell was just received).

RI-2: This second portion identifies, within the destination switching node, the port to which the destination terminal is attached. As each node maintains for all active user terminals attached to it, a list of physical port addresses and respective assigned RI's, it knows where to route a cell.

Other formats for the RI are of course possible. e.g. different lengths for RI-1 and RI-2, or segmentation of the whole RI into three or four portions (for an area node subsection of node etc.). It is only necessary that each intermediate switch knows where to route the cell by interrogating a local table with a portion of the RI, and that the destination switch can determine the correct user port by interrogating a local table with another portion of the RI.

4) Required Functions and RI List in User Terminals

Figure 4:
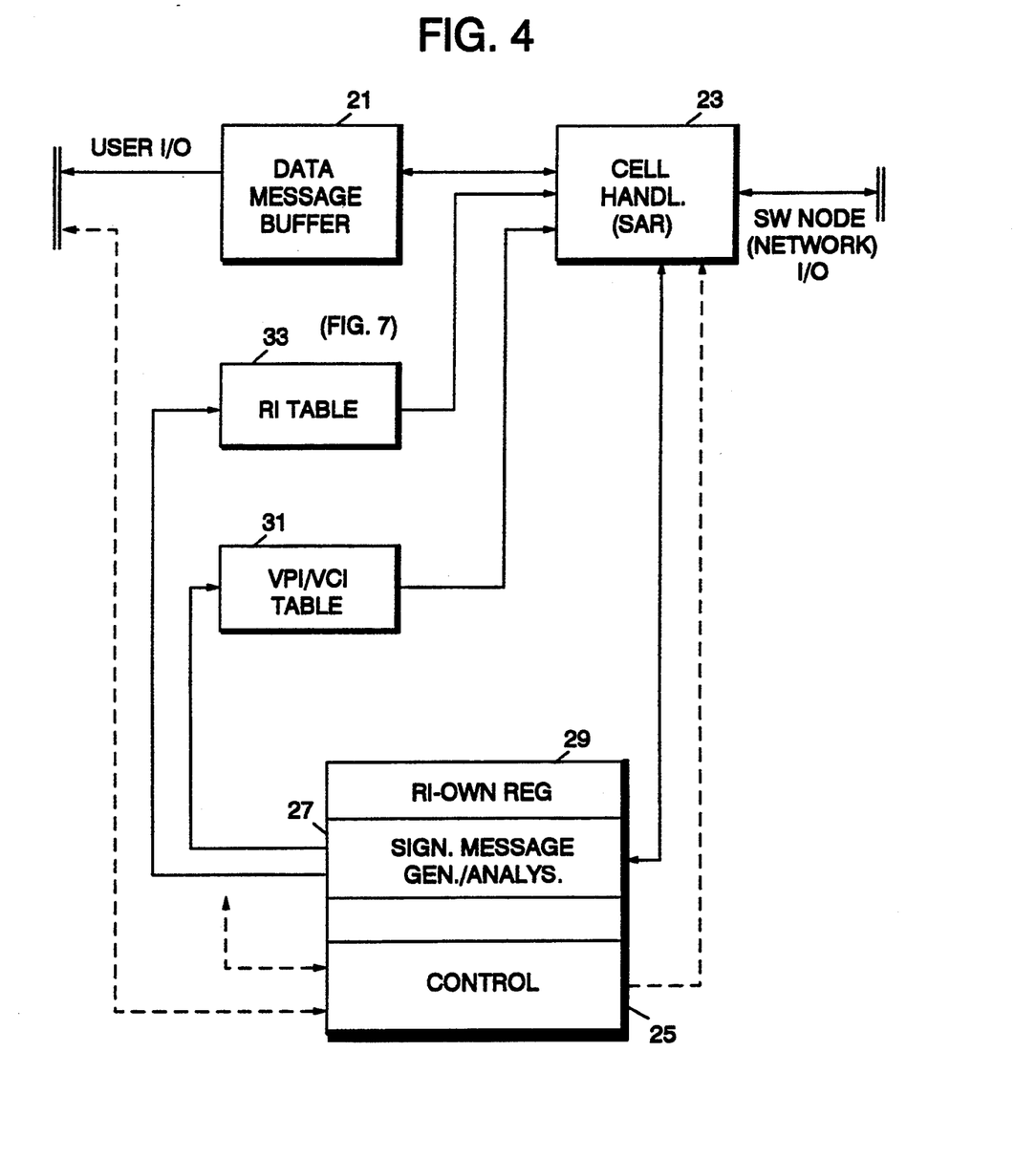
FIG. 4 is a block diagram of some functional units provided in a user terminal for implementing the invention.

Those functions (elements) of a user terminal which are essential for the invention are shown in FIG. 4. There is a data message buffer 21 for keeping messages received from, or to be furnished to the user. A cell handler 23 which exchanges ATM cells with the network (i.e. with the switching node to which the user terminal is attached) has also access to the data message buffer to enable segmenting and reassembly of messages into/from ATM cells. A control function 25 is provided which exchanges control information with the user and the various other units of the user terminal, in particular the cell handler 23. It includes a section 27 for generating signalling messages and for analyzing received signalling messages (extracting respective information). These messages are also transferred in the form of ATM cells. In connection with the signalling message generation and analysis section, there is provided a register 29 for storing the own Routing Identifier RI of the respective user terminal.

Important tables for the routing of ATM cells are a VPI/VCI table 31 (for connection-oriented routing, not part of present invention), and a table 33 of Routing Identifiers RI (for connectionless routing according to the invention). The VPI/VCI table is built up from information exchanged during connection setup, and contains the routing information to be entered into normal ATM cells to be transfered in connection-oriented mode.

Figure 7:
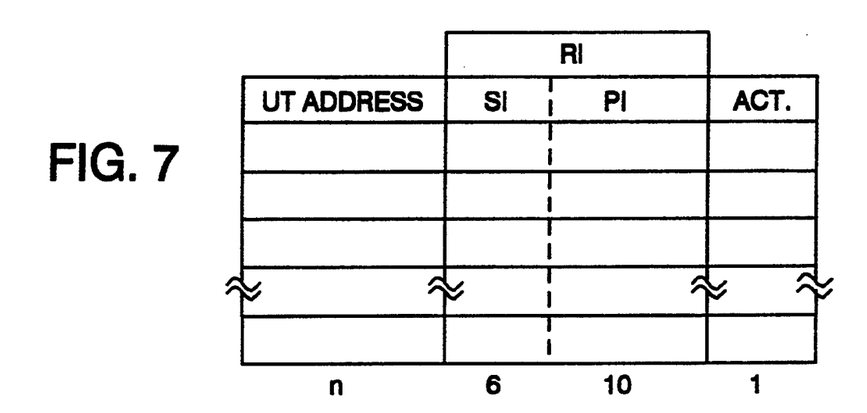
FIG. 7 is a schematic representation of the RI table provided in user terminals and in the central RIMF function.

The RI table 33 the structure of which is shown in some more detail in FIG. 7, contains the routing identifiers which the respective user terminal requested (inquired) and received from the central RIMF, for connectionless message transfer to selected user terminals. As was mentioned above, a user terminal desiring to send connectionless messages to another user requests (inquires) the respective RI from central RIMF, giving the destination user's address. When it receives a signalling message as response from the central RIMF, it enters the RI plus the destination user's address into the RI table.

As shown in FIG. 7, each entry of the RI table includes an n-bit user address, together with the allocated RI which consists of 16 bits as shown in FIG. 3. An extra bit (ACT) is provided with each entry for indicating whether the respective RI is still valid (active). Purging of the RI table and updating of the "active" indicators will be briefly outlined in section 7(d).

When the user wants to send a message to any destination, it first checks in its RI table whether that contains a respective Routing Identifier. If yes, the RI will be inserted into the VCI field of each cell of the message to be sent. If no RI is found, a signalling message (inquiry) is first transmitted for obtaining the RI from central RIMF, as was explained.

5) Required Functions and Routing Tables in Switching Nodes

Figure 5:
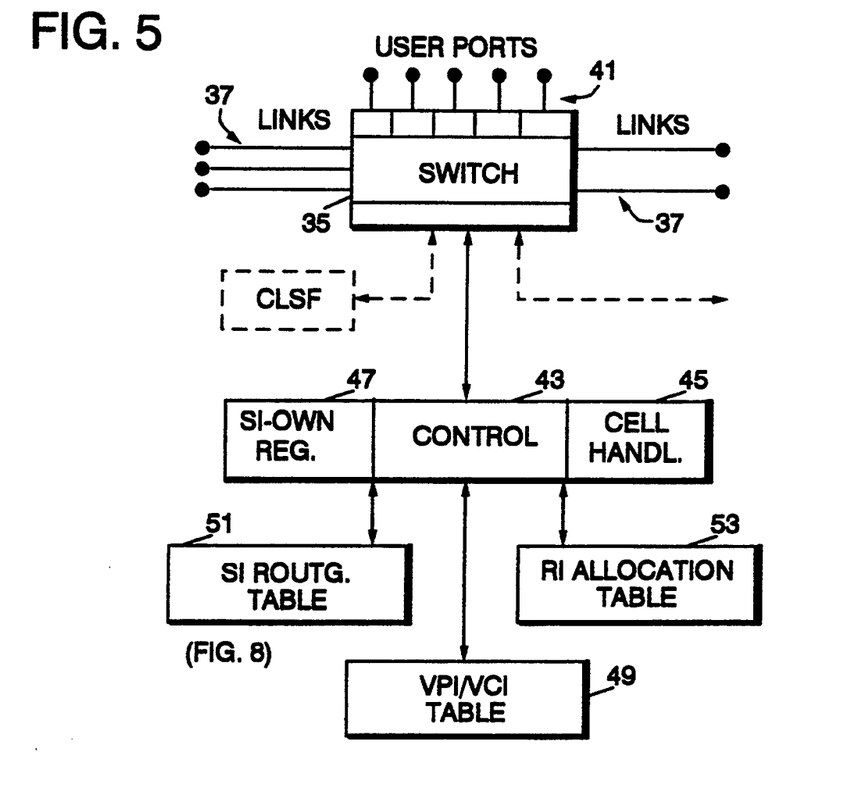
FIG. 5 is a block diagram of some functional units provided in a switching node for implementing the invention.

Functions of the switching nodes which are relevant for present invention when implemented as indicated above in section 3b) are shown in FIG. 5. Basically, the node contains a switch 35 for exchanging ATM cells between network links 37, user ports 41 (to which local user terminals are attached), and functional units of the node. Further, there is a control function 43. In connection with the control function there are provided a cell handling section 45, and a register 47 for the own switching node identifier SI of the respective node.

Several tables are available in each switching node. One is the VPI/VCI table 49. This contains all routing information derived during establishment of connections. For connectionless services using present invention, there is an SI routing table which contains for each SI (Switch Identifier) that will be used in Routing Identifiers RI, the appropriate routing information for forwarding ATM cells to the next node on their path to the destination. This latter information is once established during initialization (configuration) of the network. It is assumed that for each node, there is fixed routing information for the transfer of cells to any other of the switching nodes (each as identified by an SI). During establishment of the SI routing information, each node also receives its own Switching Node Identifier SI and stores it in register 47.

Figure 8:
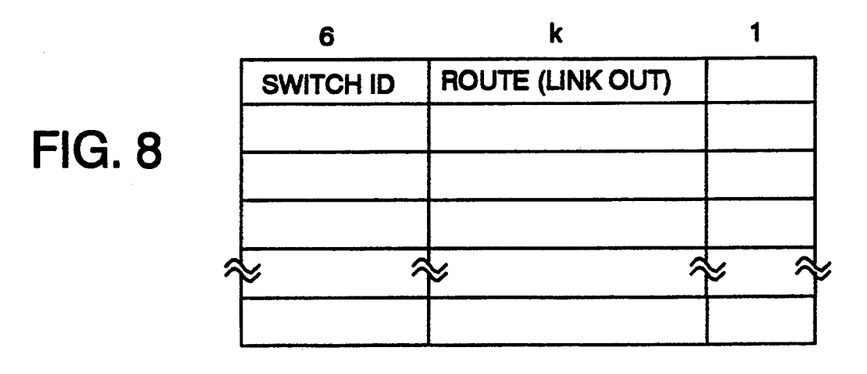
FIG. 8 is a schematic representation of an SI routing table provided switching nodes.

The format of the SI routing table 51 is shown in FIG. 8. Each entry contains, besides a 6-bit switch identifier SI, the respective k-bit routing information, e.g. an identifier for the outgoing link to be used for forwarding each cell carrying the SI in its Routing Identifier RI.

Figure 9:
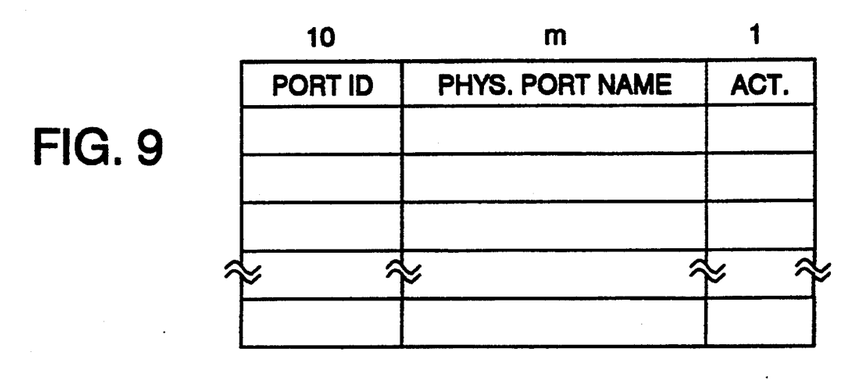
FIG. 9 is a schematic representation of the RI allocation table provided in switching nodes.

An important table provided in each switching node (if implemented as indicated in section 3(b) above) is the "RI Allocation" table 53. Details of its structure are shown in FIG. 9. The table contains in each entry, besides a Port Identifier PI (which is the second part of each Routing Identifier RI) allocated to a local user, the respective physical port name, and a status indicator ACT (active/inactive).

When the switching node receives a request from a user terminal for allocating an RI, the control section determines a still available port identifier PI, and enters this together with the physical port name of the requesting terminal (which is known to the switch) into the RI Allocation table. Then it sends in a signalling message the whole routing identifier, including as first portion the switching node's own SI identifier, and in the second portion the just allocated port identifier PI, to the requesting terminal which stores this RI in its respective register 29 (FIG. 4). Finally, the node sends a signalling message to the central RIMF, transferring the whole RI plus the address of the respective user terminal, for updating the central RI table.

Routing of ATM Cells: When the switching node receives an ATM cell on one of its incoming links (or on a user port), its control section first checks a CO/CL indication in the cell to determine whether this value indicates a normal connection-oriented cell, or whether the value indicates a connectionless cell. This CO/CL indication may be a specific value in the VPI field of the cell, or it may be manifested otherwise (cf. section 7(c) below where possibilities are briefly described). If the cell is recognized as connectionless, the node's control section further checks the first six bits of the VCI value, which in this case is the SI (switch identifier) portion of an RI (routing identifier) if this value corresponds to the node's own switch ID which is stored in register 47 (FIG. 5) for comparison, the received cell is to be transferred to a local user terminal. Then the control section uses the PI portion (last 10 bits of the RI) to interrogate its RI Allocation table for fetching the physical port name, to which the cell is forwarded in case of a match. Else the cell is discarded.

If the SI value is not the node's own node ID, then it takes the SI value to find in the SI routing table 51 the necessary routing information to forward this cell on a link to the next node on its path to the destination, or the cell is discarded if no entry is found in table 51.

The CLSF (Connectionless Service) function shown in FIG. 5 would only be used if the functions of present invention are not available. In such a case, the CO/CL indicator of an arriving ATM cell would indicate connectionless services, and then the CLSF would have to take over further handling and routing of the cell. These would be complex procedures. If the present invention is installed, the CLSF is no longer required and all operations for routing a connectionless cell can be done by fixed hardware functions in the control section, just using the information stored in the RI Allocation table and the SI routing table.

6) Required Functions and RI Table in Central RIMF

Figure 6:
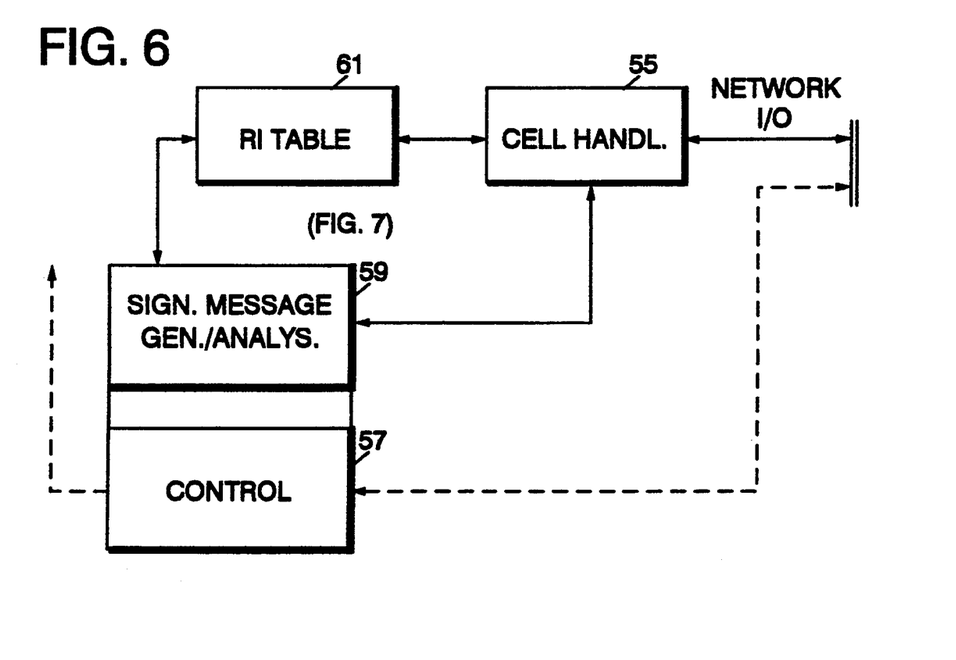
FIG. 6 is a block diagram of some functional units provided in a central Routing Identifier Management Function RIMF for implementing the invention.

FIG. 6 shows selected functions in the Routing Identifier Management Function (RIMF) of the Central Management (CM) section of the network, which are relevant to the present invention. The RIMF has a cell handling function 55 for receiving and sending signalling message cells. There is also provided a control function 57 including a signalling message analysis and generation section 59.

Further, there is provided a global table 61 of Routing Identifiers and associated addresses whose structure is essentially the same as that of the user terminal's RI table already shown in FIG. 7. This table contains, for the whole network, all user terminal addresses and allocated Routing Identifiers (plus a validity indicator ACT for each).

When the RIMF receives a signalling message from a switching node carrying a newly allocated RI, this value is entered into the global RI list together with the respective user terminals address.

When the RIME receives, from a user terminal, a signalling message carrying another user terminal's address and an inquiry for the associated RI, the RI table 61 is interrogated. In case of a match, the respective RI is returned as response to the inquiring (requesting) user terminal. If no matching user address is found in the RI list, an error message is returned as response.

Some modifications and maintenance/updating functions for the RIMF and its RI table are briefly outlined in the following section 7(d).

7) Auxiliary Functions, Modifications, Alternatives a) Signalling Message Transfer

Signalling messages for connectionless services using present invention, may be transferred through the network over point-to-point SVCs (Signalling Virtual Connections). These SVCs are established by meta-signalling procedures. A description can be found in CCITT Draft Recommendation 1.311 "B-ISDN General Network Aspects": contained in Report 34 of CCITT Study Group XVIII (June 1990).

b) Centralized Allocation of RI's by RIMF

In the above description, allocation of RIs was made by the local switching node to which a user terminal is attached. It is also possible that the allocation of all RI's is made by the RIMF. In this case, the request of the user terminal would be transferred to the central RIMF, the reponse for the user would be prepared there, and RIME could then update its own RI table (61 in FIG. 6) immediately. A notification message should then be sent to the local switching node of the requesting user so that this node could update its RI Allocation table (53 in FIG. 5) and forward the response to the user. Otherwise, operation would be the same as described above (i.e. requesting a destination user RI from the RIMF by a source user, and routing of connectionless cells using the tables in user terminals, switching nodes, and RIMF).

c) Identification of CO and CL Services

To enable distinction between ATM cells transferred in connection-oriented mode (CO) from those transferred in connectionless mode (CL), a respective indicator should be inserted into the header of each cell. This indicator could be either inserted in the segment type field ST (cf. FIG. 2B), or in the reserved field r, or in the VPI field.

For the present description it was assumed that a single value inserted into the VPI field identifies connectionless cells. (Of course, a plurality of different values could be provided, to distinguish different classes of connectionless service etc.).

d) Maintenance/Updating of RI Tables

(d1) Dynamic/Static RI Tables

In the above description, dynamic RI tables were provided, i.e. an RI value and-associated information was only entered into a table when the respective RI value was actually allocated to a user port. Such a procedure is necessary if the maximum number of user ports is greater than the number of available RI values. When an RI value is deactivated in such a dynamic table (c.f. below for deactivation procedure), the respective RI value cannot be reassigned immediately because the deactivation would not yet be known to source users having this RI in their RI table. Therefore, an unassigned RI value has to be frozen for a time T1 before it becomes free for reassignment.

Static RI tables can be used if the maximum number of user ports is smaller than the number of available RI values. That means the RI values can be assigned permanently to the user ports. The local switching node only has to mark in the RI table (FIG. 9) whether a user is active or not in order to respond properly to an RI acquisition request (and to a deactivation notification).

(d2) Deactivation Prompted by Destination User

When a user will no longer participate in connectionless data transfer services as destination, it sends a respective deactivation signalling message (notify message) to the local switching node which thereupon will mark the RI value unassigned and will notify the RIMF to do the same in its RI table. (If all allocations are made centrally as indicated in section 7(b) above, the deactivation message is transferred first to the RIMF which then notifies the local switching node).

(d3) Deactivation in Source User RI Tables

When an RI value is deactivated as described in Section 7(d2) above, none of the source users which had requested and received the respective RI will be notified. Thus, since a user is not aware of the deactivation of a destination, every entry in the RI table (33 in FIG. 4) is to be supervised by a timer T2. Every time an entry is used for transmitting a message, timer T2 will be reset. If timer T2 expires the corresponding entry in the RI table will be deleted. For a proper operation timer T2 has to be smaller than timer T1 used for freezing of unassigned RI values (mentioned in section 7(d1) above).

e) Segmentation of Messages into Cells and Reassembly

Similarly as already provided in the CCITT specifications, also in connectionless services according to the invention, there is required for the preservation and multiplexing of messages a segment type (ST) and a multiplexing identification (MID) field in the cell headers. The value in the MID field allows, at the destination side, to identify the cells which belong to the same connectionless message. This value has to be unique.

There are several alternatives to select the MID value for a message: (1) A random MID value can be chosen by the sender for every message it wants to send. (2) MID values could also be managed by the central RIMF, and assigned to a user at the time when it is allocated an RI value. If required, more than one MID value can be assigned by the RIMF to one user terminal, thus allowing the interleaving of messages to a certain destination. (3) The RI value of the source (the sending user) can also be used as MID value for messages.

When the source RI value is used as MID, there are two possibilities: (a) Either, the last ten bits of the RI value are taken as MID (cf. FIG. 3). In most cases, this is sufficient for properly distinguishing messages. (b) However, if more MID values would be required, the whole RI value of 16 bits should be taken as MID. If this is done, the SAR header in connectionless cells (cf. FIG. 2b) should be extended from two to three octets. This will allow to extend the MID field from 10 bits to the required 16 bits: two further bits in the enlarged SAR header could be left for reserve. However, one octet will then be lost for the payload field.

An advantage of using the source RI value as MID value is that the receiver does not need to perform the RI acquisition procedure because the MID value of a message can be used as RI value for the reponse.

f) Common Table for Connection-Oriented and for Connectionless Routing Information The ATM switching nodes (FIG. 5) were described as having two segregate tables for VPI/VCI values and for allocated RI values. It is of course possible to enter all values into one table or storage. This would simplify the access (provided that unique values are used).

g) Intra-domain/Extra-Domain Transfers

The invention described above allows to provide connectionless data service within one domain (a domain being e.g. a CPN or other area network for which one Central Management and RIMF are provided). If the destination user lies outside of the domain of RIMF, the inter-domain routing of the connectionless cells has to be handled by some CLSF. Within a RIMF domain, one or several CLSFs can appear. They may be part of the subnetwork served by the RIMF or not, they may be local or remote. The RIMF allocates an RI value to every CLSF that appears in the domain.

From a user point of view there is no difference between the procedures for intra-domain and those for inter-domain data transfers. In both cases he has always to acquire the RI value before sending the first connectionless message. This RI value is in the intra-domain case the value assigned to the destination. Otherwise, in the inter-domain case this value is the one assigned to the CLSF which will perform the inter-domain routing. In all cases, the functions at end stations are identical.

For the network, in case of intra-domain traffic the cells are routed directly to the destination user based on the RI value, whereas in case of inter-domain traffic, a two-level switching applies: First an ATM switching takes place based on the RI value for transferring the cells between user and CLSF, and secondly within a source CLSF an overlay switching based on ST and MID values routes the cells to the destination CLSF.

However, inter-domain traffic is expected to be only a small fraction of all traffic. The majority of data message transfers will occur within a domain (intra-domain) and can therefore be handled without CLSF, using only the connectionless data transfer services introduced by the invention.

We claim:

1. A method of transferring data messages, without establishing a connection between users, in an Asynchronous Transfer Mode system otherwise using established connections for data message transfers through a given network comprising switching nodes, the method comprising the steps of:
A) allocating a routing identifier RI to any user being activated at a specific network location for connectionless data transfer services;
said routing identifier RI being in two-part form, the first part (RI-1) comprising an identification (SI) of the local switching node to which the respective user is connected, and the second part (RI-2) comprising an identification (PI) of the port within said local switching node to which the respective user is connected;
B) providing in each switching node of said network at least one table including at least a portion of each allocated routing identifier RI and respective routing directions for correctly routing a message cell containing a routing identifier RI, to the respective user;
C) providing in the network a central management function including a global table with the address of each user activated for connectionless service, together with the allocated routing identifier RI; and
D1) transmitting, by a source user desiring to send a data message in connectionless mode to another user, a signalling message with the destination user's address to said central management function, requesting said destination user's routing identifier RI,
D2) receiving, by said source user, from central management in a signalling message the respective routing identifier RI if existing, and
D3) sending, by the source user, a data message to said destination user by including said received routing identifier RI in the header of a message of said data message.

2. Method according to claim 1, including the step of providing in each switching node, a first table including in each entry a switching node identification (SI) of another node in the network, plus routing information for routing cells from the respective node holding said first table, to the node associated with said switching node identification.

3. A method of transferring data messages, without establishing a connection between users, in an ATM system otherwise using established connections for data message transfers through a given network comprising switching nodes, the method comprising the steps of:
A) allocating a routing identifier RI to any user being activated at a specific network location for connectionless data transfer services;
said routing identifier RI being in two-part form, the to first part (RI-1) comprising an identification (SI) of the local switching node to which the respective user is connected, and the second part (RI-2) comprising an identification (PI) of the port within said local switching node to which the respective user is connected;
B) providing in each switching node of said network a first table including at least a portion of each allocated routing identifier RI and respective routing directions for correctly routing each message's cell containing a routing identifier RI, to the respective user;
providing in each switching node, a second table including in each entry, the name of a local port to which a user is connected plus a port identification (PI) which is allocated to the respective user;
C) maintaining in a central management function of the network a global table including the address of each user activated for connectionless service, together with the allocated routing identifier RI; and
D1) transmitting, by a source user desiring to send a data message in connectionless mode to another user, a signalling message with the destination user's address to said central management function, requesting said destination user's routing identifier RI,
D2) receiving, by said source user, from central management in a signalling message the respective routing identifier RI if existing, and
D3) sending, by the source user, a data message to said destination user by including said received routing identifier RI in the header of a message of said data message.

4. A method of transferring data messages, without establishing a connection between users, in an Asynchronous Transfer Mode system otherwise using established connections for data message transfers through a given network comprising switching nodes, the method comprising the steps of:
providing in each switching node of said network a first table including at least a portion of an allocated routing identifier RI and respective routing directions for correctly routing a message cell containing a routing identifier RI, to the respective user;
providing in each switching node, a second table including in each entry, the name of a local port to which a user is connected plus a port identification PI which is allocated to the respective user;

providing, in the network a network center having a central management function with a global table including the address of each user activated for connectionless service, together with the allocated routing identifier RI;

receiving a signalling message from a user for allocation of routing identifier RI, in a switching node to which said user is connected, determining a free port identifier PI, and entering this together with the name of the port where the user is connected into said second table, sending a signalling message containing the complete allocated routing identifier RI, including the respective switching node identification SI, the newly allocated port identification PI, and the respective user's address, to said network center, entering the newly allocated routing identifier RI together with the user's address into said global table in the network center;

allocating a routing identifier RI to any user being activated at a specific network location for connectionless data transfer services; said routing identifier RI being in a two-part form, the first part (RI-1) comprising an identification (SI) of the local switching node to which the respective user is connected, and the second part (RI-2) comprising an identification (PI) of the port within said local switching node to which the respective user is connected;

transmitting, by a source user desiring to send a data message in connectionless mode to another user, a signalling message with the destination user's address to said central management function, requesting said destination user's routing identifier RI, receiving, by said source user, from central management in a signalling message the respective routing identifier RI if existing, and sending, by the source user, a data message to said destination user by including said received routing identifier RI in the header of a message cell of said data message.

5. A method of transferring data messages, without establishing a connection between users, in a Asynchronous Transfer Mode system otherwise using established connections for data message transfers through a given network comprising switching nodes, the method comprising the steps of:
A) allocating a routing identifier RI to any user being activated at a specific network location for connectionless data transfer services;
B) providing in each switching node of said network a table including at least a portion of each allocated routing identifier RI and respective routing directions for correctly routing a message cell containing a routing identifier RI, to the respective user;
C) providing, in a node of the network a central management function which includes, a global table including the address of each user activated for connectionless service, together with the allocated routing identifier RI; and
D1) transmitting, by a source user desiring to send a data message in connectionless mode to another user, a signalling message with the destination user's address to said central management function, requesting said destination user's routing identifier RI,
D2) receiving, by said source user, from the central management function in a signalling message the respective routing identifier RI if existing, and
D3) sending, by the source user, a data message to said destination user by including said received routing identifier RI in the header and into a multiplexing identification (MID) field of at least one cell of said data message.

6. A method of transferring data messages, without establishing a connection between users, in an Asynchronous Transfer Mode system otherwise using established connections for data message transfers through a given network comprising switching nodes, the method comprising the steps of:
A) allocating a routing identifier RI to any user being activated at a specific network location for connectionless data transfer services;
B) providing in each switching node of said network at least one table including at least a portion of each allocated routing identifier RI and respective routing directions for correctly routing a message cell containing a routing identifier RI, to the respective user;
C) providing in the network a central management function including a global table with the address of each user activated for connectionless service, together with the allocated routing identifier RI; and
D1) transmitting, by a source user desiring to send a data message in connectionless mode to another user, a signalling message with the destination user's address to said central management function, requesting said destination user's routing identifier RI,
D2) receiving, by said source user, from central management, in a signalling message the respective routing identifier RI if existing,
D3) sending, by the source user, a data message to said destination user by including said received routing identifier RI in the header of a message of said data message; and entering a routing identifier RI received according to step D2, into a local table together with the respective destination user's address, starting, with the sending of each data message to a destination user according to step D3, a timer associated with the respective entry in said local table, and when the timer expires, invalidating the respective entry in said local table.

7. Apparatus for transferring data messages, without establishing a connection between users, in an Asynchronous Transfer Mode system otherwise using established connections for data message transfers through a given network comprising a plurality of switching nodes (11), a plurality of user units (15) connected to each one of the switching nodes, and a network management center (17, 19), the apparatus comprising:
A) means (43, 47, 53) associated with the switching nodes for allocating a routing identifier RI to any user unit being activated at a specific network location for connectionless data transfer services;
B) in each switching node of said network, table means (51, 53) including at least a portion of each allocated routing identifier RI and respective routing directions for correctly routing a message cell containing a routing identifier RI, to the respective user unit;

C) in the network management center, means (59, 61) for maintaining a global table including the address of each user unit activated for connectionless service, together with the allocated routing identifier RI, and means (55, 59) for updating this table each time a new routing identifier RI is allocated to a user unit;

said routing identifier RI being in two-part form, including a first part (I-1) for an identification (SI) of the local switching node to which the respective user is connected, and a second part (RI-2) for an identification (PI) of the port within said local switching node to which the respective user is connected;

D) in each user unit:
  D1) means (27, 31) for transmitting, when the user unit desires to send a data message in connectionless mode to another user, a signalling message to said network management center requesting the destination user's routing identifier RI,
  D2) means (27, 33) for receiving, from said network management center in a signalling message the respective routing identifier RI if existing, and
  D3) means (21, 23, 33) for sending a data message to said another user by including said received routing identifier RI in the header of at least one cell of said data message.

8. Apparatus according to claim 7, wherein
each switching node comprises a first table (51) including in each entry a switching node identification (SI) of another node in the network, plus routing information for routing cells from the respective node holding said first table, to the node associated with said switching node identification.

9. Apparatus for transferring data messages, without establishing a connection between users, in an Asynchronous Transfer Mode system otherwise using established connections for data message transfers through a given network comprising a plurality of switching nodes (11), a plurality of user units (15) each connected to one of the switching nodes, and a network management center (17, 19), the apparatus comprising:

A) means (43, 47, 53) associated with the switching nodes for allocating a routing identifier RI to any user unit being activated at a specific network location for connectionless data transfer services;

B) in each switching node of said network, table means (51, 53) including at least a portion of each each allocated routing identifier RI and respective routing directions for correctly routing a message cell containing a routing identifier RI,
a second table (53) including in each entry, the name of a local port to which a user is connected plus a port identification (PI) which is allocated to the respective user; and C) in the network management center, means (59, 61) for maintaining a global table including the address of each user unit activated for connectionless service, together with the allocated routing identifier RI, and means (55, 59) for updating this table each time a new routing identifier RI is allocated to a user unit;

said routing identifier RI being in two-part form, including a first part (RI-1) for an identification (SI) of the local switching node to which the respective user is connected, and a second part (RI-2) for an identification (PI) of the port within said local switching node to which the respective user is connected to the respective user unit;

D) in each user unit:
  D1) means (27, 31) for transmitting, when the user unit desires to send a data message in connectionless mode to another user, a signalling message to said network management center requesting the destination user's routing identifier RI,
  D2) means (27, 33) for receiving, from said network management center in a signalling message the respective routing identifier RI if existing, and
  D3) means (21, 23, 33) for sending a data message to said another user by including said received routing identifier RI in the header of at least one cell of said data message.

10. A method of transferring data messages, without establishing a connection between users, in an Asynchronous Transfer Mode system otherwise using established connections for data message transfers through a given network comprising switching nodes, the method comprising the steps of:

A1) providing in each switching node of said network at least one table including at least a portion of each allocated routing identifier RI and respective routing directions for correctly routing a message cell containing a routing identifier RI, to the respective user;

A2) providing, in the network a network center with a global table including the address of each user activated for connectionless service, together with the allocated routing identifier RI;

B1) receiving a signalling message from a user for allocation of routing identifier RI, in a switching node to which said user is connected;

B2) determining a free port identifier (PI and entering this together with the name of the port where the user is connected into a second table, B3) sending a signalling message containing the complete allocated routing identifier RI, including the respective switching node identification (SI the newly allocated port identification (PI and the respective user's address, to said network center, B4) entering the newly allocated routing identifier RI together with the user's address into said global table in the network center;

C1) transmitting, by a source user desiring to send a data message in connectionless mode to another user, a signalling message with the destination user's address to said central management function, requesting said destination user's routing identifier RI, C2) receiving, by said source user, from a central management in a signalling message the respective routing identifier RI if existing, and C3) sending, by the source user, a data message to said destination user by including said received routing identifier RI in the header of at least a message cell of said data message.

11. A method of transferring data messages, without establishing a connection between users, in an Asynchronous Transfer Mode network otherwise using established connections for data message transfers through a given network comprising switching nodes, the method comprising the steps of:
A) allocating a routing identifier RI to any user being activated at a specific network location for connectionless data transfer services;
said routing identifier RI being in two-part form, the first part (RI-1) comprising an identification (SI) of the local switching node to which the respective user is connected, and the second part (RI-2) comprising an identification (PI) of the port within said local switching node to which the respective user is connected;
B) providing in each switching node of said network at least one table including at least a portion of each allocated routing identifier RI and respective routing directions for correctly routing a message cell containing a routing identifier RI, to the respective user;
C) providing in the network a central management function including a global table with the address of each user activated for connectionless service, together with the allocated routing identifier RI; and
D1) transmitting, by a source user desiring to send a data message in connectionless mode to another user, a signalling message with the destination user's address to said central management function, requesting said destination user's routing identifier RI,
D2) receiving, by said source user, from the central management function in a signalling message the respective routing identifier RI if existing, and
D3) sending, by the source user, a data message to said destination user by including said received routing identifier RI in the header of at least one cell of said data message.

12. Apparatus for transferring data messages, without establishing a connection between users, in an Asynchronous Transfer Mode system otherwise using established connections for data message transfers through a given network comprising a plurality of switching nodes (11), a plurality of user units (15) each connected to one of the switching nodes, and a network management center (17, 19), the apparatus comprising:
A) means (43, 47, 53) associated with the switching nodes for allocating a routing identifier RI to any user unit being activated at a specific network location for connectionless data transfer services;
B) in each switching node of said network, table means (51, 53) including each allocated routing identifier RI and respective routing directions, said routing identifier RI being in two-part form, including a first part (RI-1) for an identification (SI) of the local switching node to which the respective user is connected, and a second part (RI-2) for an identification (PI) of the port within said local switching node to which the respective user is connected for correctly routing a message cell containing a routing identifier RI, to the respective user unit;
including in each entry a switching node identification (SI) of another node in the network, plus routing information for routing cells from the respective node holding said table means to the node associated with said switching node identification
C) in the network management center, means (59, 61) for maintaining a global table including the address of each user unit activated for connectionless service, together with the allocated routing identifier RI, and means (55, 59) for updating this table each time a new routing identifier RI is allocated to a user unit; and
D) in each user unit:
D1) means (27, 31) for transmitting, when the user unit desires to send a data message in connectionless mode to another user, a signalling message to said network management center requesting the destination user's routing identifier RI,
D2) means (27, 33) for receiving, from said network management center in a signalling message the respective routing identifier RI if existing, and
D3) means (21, 23, 33) for sending a data message to said another user by including said received routing identifier RI in the header of at least one cell of said data message.

* * * * *

UNITED STATES PATENT AND TRADEMARK OFFICE
CERTIFICATE OF CORRECTION

PATENT NO. : 5,432,777
DATED : July 11, 1995
INVENTOR(S) : Jean-Yves Le Boudec, Linh Troung It is certified that error appears in the above-identified patent and that said Letters Patent is hereby corrected as shown below:

Column 12, line 17, delete "to".

Signed and Sealed this

Second Day of January, 1996

*Attest:*

BRUCE LEHMAN

*Attesting Officer*     Commissioner of Patents and Trademarks

UNITED STATES PATENT AND TRADEMARK OFFICE
CERTIFICATE OF CORRECTION

PATENT NO. : 5,432,777
DATED : July 11, 1995
INVENTOR(S) : Jean-Yves Le Boudec, Linh Troung It is certified that error appears in the above-identified patent and that said Letters Patent is hereby corrected as shown below:

Column 15, line 52, delete "each".

Signed and Sealed this

Seventh Day of May, 1996

Attest:

BRUCE LEHMAN

Attesting Officer

Commissioner of Patents and Trademarks